(12) United States Patent
Sanford et al.

(10) Patent No.: US 6,978,736 B2
(45) Date of Patent: Dec. 27, 2005

(54) COLLAPSIBLE KENNEL FOR USE WITH CAPPED TRUCK BEDS

(76) Inventors: Dennis W. Sanford, 1510 Cumberland Ave., Lowell, MI (US) 49331; Douglas W. Sanford, 1339 Oakwood St., Belding, MI (US) 48809

( * ) Notice: Subject to any disclaimer, the term of this patent is extended or adjusted under 35 U.S.C. 154(b) by 0 days.

(21) Appl. No.: 10/767,702

(22) Filed: Jan. 29, 2004

(65) Prior Publication Data

US 2005/0166862 A1   Aug. 4, 2005

(51) Int. Cl.[7] .............................................. A01K 1/02
(52) U.S. Cl. ...................................... 119/496; 119/513
(58) Field of Search ........................ 119/496, 498, 499, 119/502, 513, 514, 412, 482, 512, 753, 771; 190/8; 296/37.6, 37.5, 37.16, 39.2, 37.1; 297/158.4, 233, 248, 158.5, 14, 16.1, 256.15

(56) References Cited

U.S. PATENT DOCUMENTS

| | | | | |
|---|---|---|---|---|
| 1,669,300 A * | 5/1928 | Hunter ............................ 220/6 |
| 2,067,661 A * | 1/1937 | Ferrelle ......................... 108/46 |
| 2,897,781 A * | 8/1959 | Olson ............................ 119/496 |
| 3,063,064 A * | 11/1962 | Mace ............................... 5/94 |
| 3,636,892 A * | 1/1972 | Linton .......................... 108/79 |
| 3,797,462 A * | 3/1974 | Davis .......................... 119/771 |
| 4,155,312 A * | 5/1979 | Thorkildson ................ 108/137 |
| 4,351,555 A * | 9/1982 | Hashimoto ................ 296/37.16 |
| 4,512,286 A * | 4/1985 | Rux .............................. 119/771 |
| 4,674,665 A * | 6/1987 | Van Kirk .................... 224/404 |
| 5,065,699 A | 11/1991 | Marshall |
| 5,083,828 A * | 1/1992 | Accettura ................... 296/37.6 |
| 5,133,294 A * | 7/1992 | Reid ........................... 119/771 |
| 5,147,103 A | 9/1992 | Ducote |
| 5,709,329 A * | 1/1998 | Johnson ...................... 224/402 |
| D397,082 S | 8/1998 | Kunkel |
| 6,109,847 A * | 8/2000 | Patel et al. .................. 410/129 |
| 6,149,040 A * | 11/2000 | Walker ........................ 224/539 |
| 6,250,700 B1 | 6/2001 | Traxler |
| 6,401,995 B1 | 6/2002 | Yuille et al. |
| 6,439,639 B1 * | 8/2002 | Branting ................. 296/100.09 |
| 6,499,434 B1 | 12/2002 | Tyler |
| 6,536,826 B1 | 3/2003 | Reed |
| 6,644,709 B2 * | 11/2003 | Inagaki et al. ........... 296/37.16 |
| 6,719,347 B2 * | 4/2004 | Gehring et al. ............ 296/37.5 |
| 2001/0040382 A1 * | 11/2001 | Nemoto ................... 296/37.14 |
| 2002/0153737 A1 * | 10/2002 | Fitts ........................ 296/26.11 |

* cited by examiner

Primary Examiner—Yvonne R. Abbott
(74) Attorney, Agent, or Firm—Dale J. Ream

(57) ABSTRACT

A collapsible kennel for use with capped truck beds includes a foldable floor section connected to a foldable wall section. When unfolded and assembled, the floor section is supported by a truck bed's side rails. If only a front wall section is used, the kennel must be abutted to the cab of the truck. If a front and a back wall section are used, the kennel may be anywhere along the length of the truck bed's side rails. The truck cap provides a ceiling and two sides. The wall section has doors to allow animal ingress and egress. The doors may be remotely opened by pulling a cord. The collapsible kennel has a divider for selectively dividing the kennel. When collapsed, the kennel can be easily stored and transported.

19 Claims, 11 Drawing Sheets

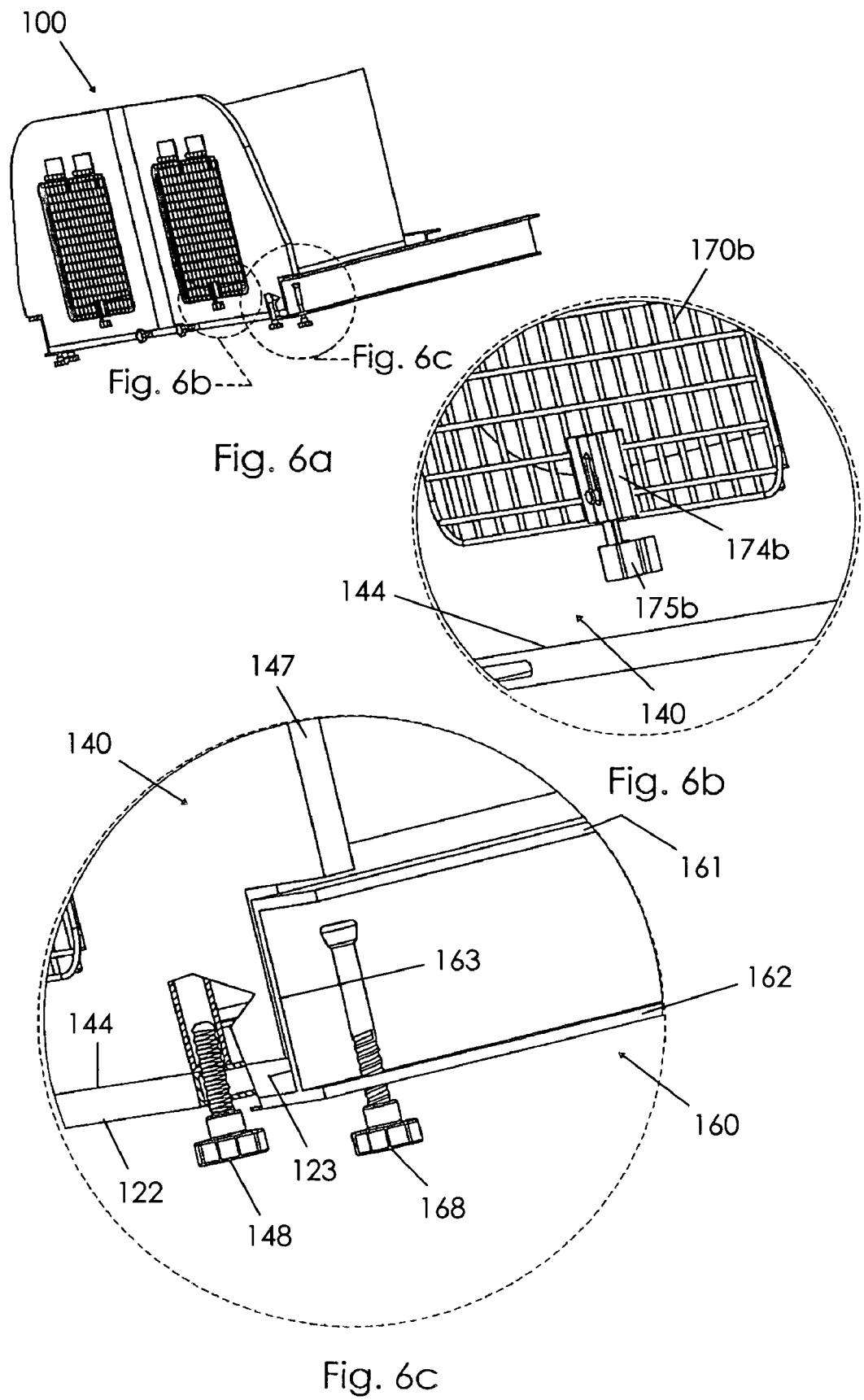

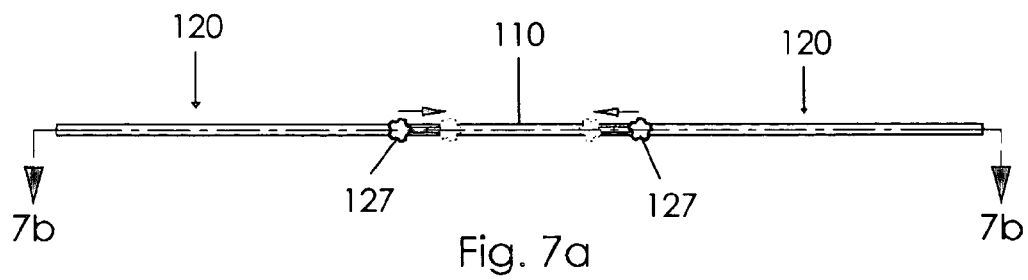
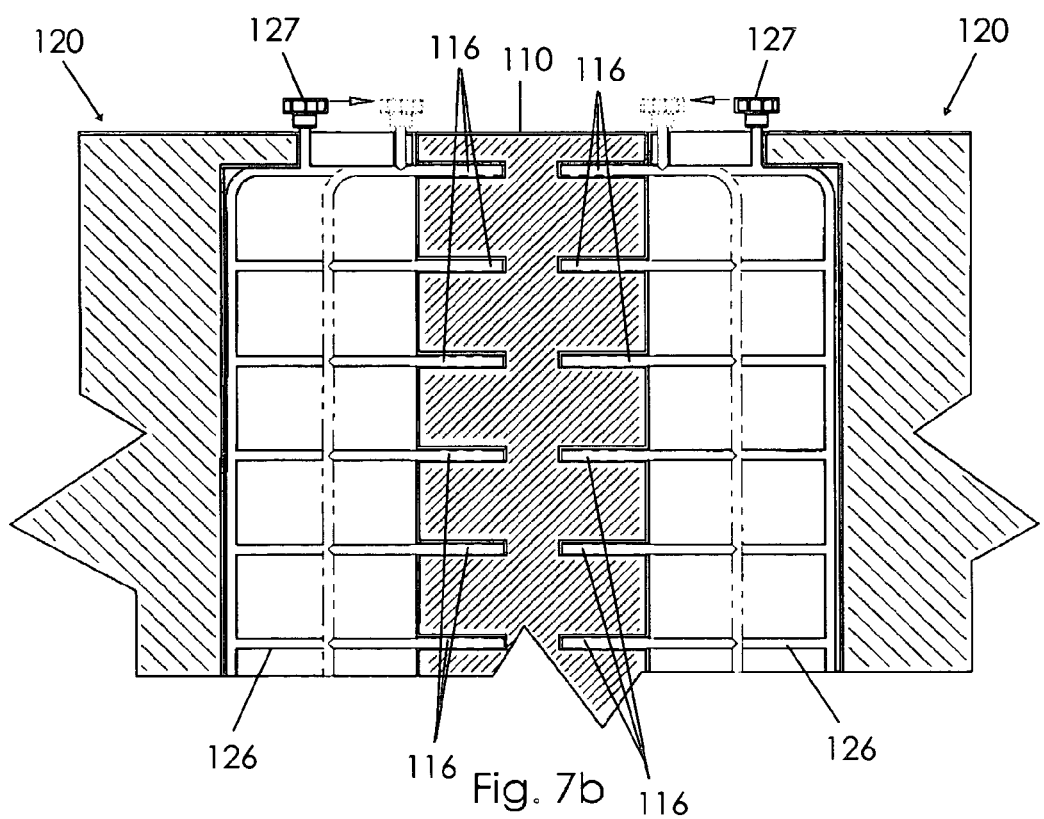

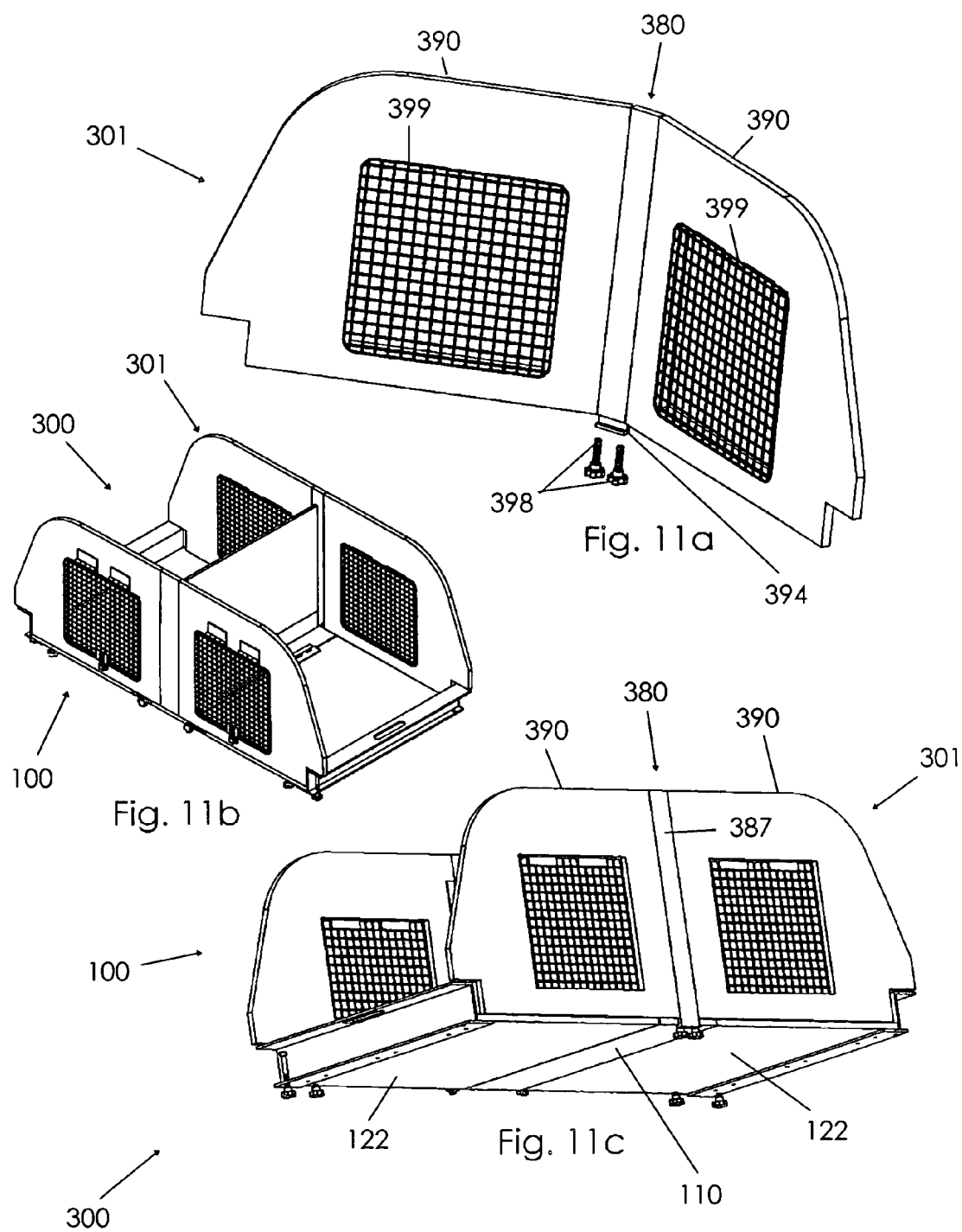

COLLAPSIBLE KENNEL FOR USE WITH CAPPED TRUCK BEDS

BACKGROUND OF THE INVENTION

This invention relates generally to animal kennels for use with truck beds and, more particularly, to a collapsible kennel for use with capped truck beds that may be easily installed and uninstalled by a user and can be easily transported and stored.

Transporting dogs in a truck bed is often a difficult and dangerous undertaking. If the dog is not restrained, it may be tossed into the sides or even out of the bed when the vehicle makes sudden stops or hard turns. A truck cap (also known as a topper, shell, or camper shell) provides some protection but still leaves the dog at risk and allows it to roam around the bed without restraint. Harnesses and leashes provide restraint but can harm the dog during abrupt movements. Other than permanently installing a kennel, the only option is to transport dogs in a portable kennel that is securely tied down to the bed. This is a time-consuming and cumbersome task for people who do not wish to install a permanent kennel. This category of people would include those who need full use of their truck bed and those who only occasionally transport their dog(s) for hunting trips, vacations, etc.

Currently available kennels that are made for truck beds often occupy an excessive amount of space in the bed, such as in U.S. Pat. Nos. 6,499,434 and 5,147,103. They also tend to be heavy, difficult to install, and expensive. Many are not compatible with truck caps or would require permanent modifications to the cap, such as in U.S. Pat. Nos. 6,499,434 and Des. 397,082. Additionally, the existing kennels are not collapsible and require large storage space when not in use.

Therefore, it is desirable to have a kennel compatible with capped trucks that uses a limited amount of space, is easily installed and uninstalled by the user, does not require permanent modifications to the cap, is collapsible into a manageable package for storage, provides comfortable housing, and is relatively light and inexpensive.

SUMMARY OF THE INVENTION

A collapsible kennel for use with capped truck beds according to the present invention includes a foldable floor section coupled to one or two foldable wall sections. When assembled and in use, the collapsible kennel rests on a truck bed's side rails, leaving cargo space available in the truck bed. The truck cap provides two opposing walls and a ceiling while the collapsible kennel provides a floor and at least one wall. If only one wall of the collapsible kennel is used, the collapsible kennel must be positioned against the truck cab to provide the opposing wall. The collapsible kennel further includes a divider capable of providing two separate areas for transporting multiple animals and doors for animal ingress and egress. When collapsed, the collapsible kennel can be easily transported and stored due to its configuration and size.

Therefore, a general object of this invention is to provide a kennel compatible with capped trucks that offers comfortable housing for an animal.

Another object of this invention is to provide a kennel, as aforesaid, that is easily installed and uninstalled by the user and does not require permanent modifications to the cap.

Still another object of this invention is to provide a kennel, as aforesaid, that is collapsible into a manageable package for storage and easily transported.

Yet another object of this invention is to provide a kennel, as aforesaid, that is capable of providing two separate areas for transporting multiple animals.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 6a is another perspective view of the collapsible kennel as in FIG. 1;

FIG. 6b is an isolated perspective view on an enlarged scale of a door closure arrangement as in FIG. 6a;

FIG. 6c is an isolated perspective view on an enlarged scale of a side support bracket and clamp bolt and a panel bolt connecting a side floor panel to a side front panel as in FIG. 6a;

FIG. 7a is a front view of a floor section removed from the collapsible kennel of FIG. 1a;

FIG. 7b is a sectional view taken along line 7b—7b of FIG. 7a;

FIG. 10b is an isolated perspective view on an enlarged scale of an alternate door as in FIG. 10a;

FIG. 11a is a perspective view of a rear wall compatible with the collapsible kennel as in FIG. 1;

FIG. 11b is a perspective view of the rear wall as in FIG. 11a combined with the collapsible kennel as in FIG. 1; and FIG. 11c is another perspective view of the rear wall as in FIG. 11a combined with the collapsible kennel as in FIG. 1.

DRAWINGS—REFERENCE NUMERALS

Figure 1A:
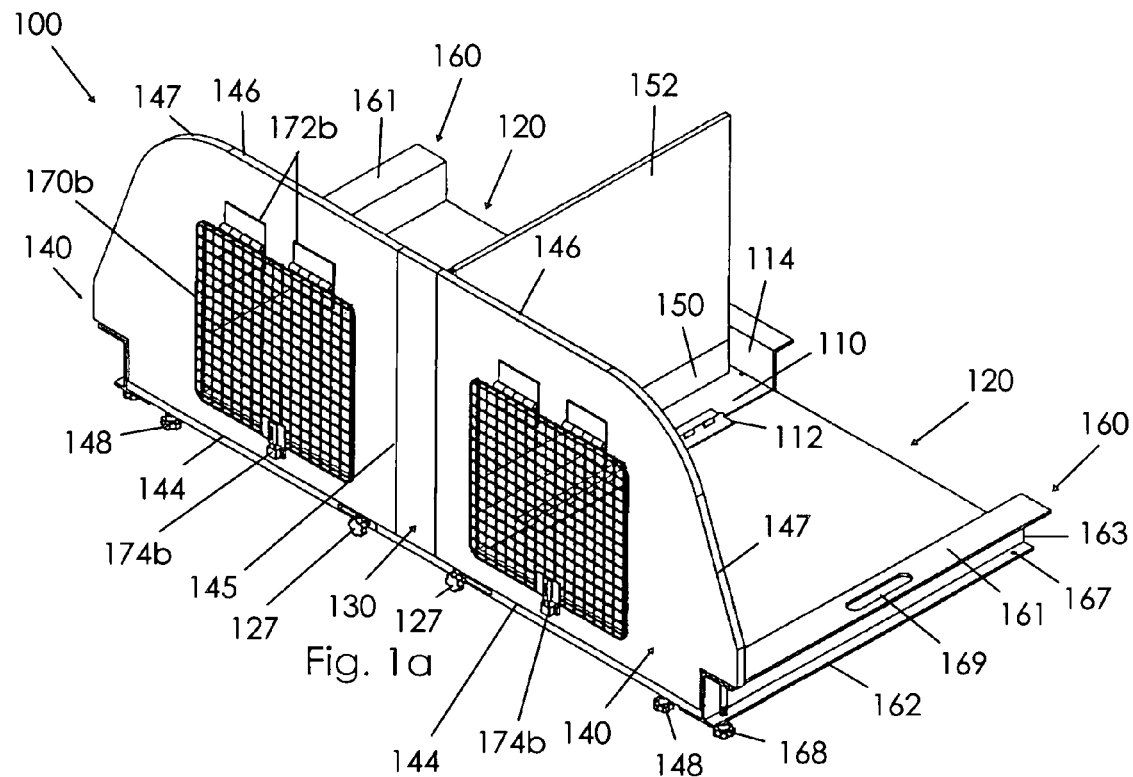
FIG. 1a is a front perspective view of a collapsible kennel according to a preferred embodiment of the present invention.
Figure 1B:
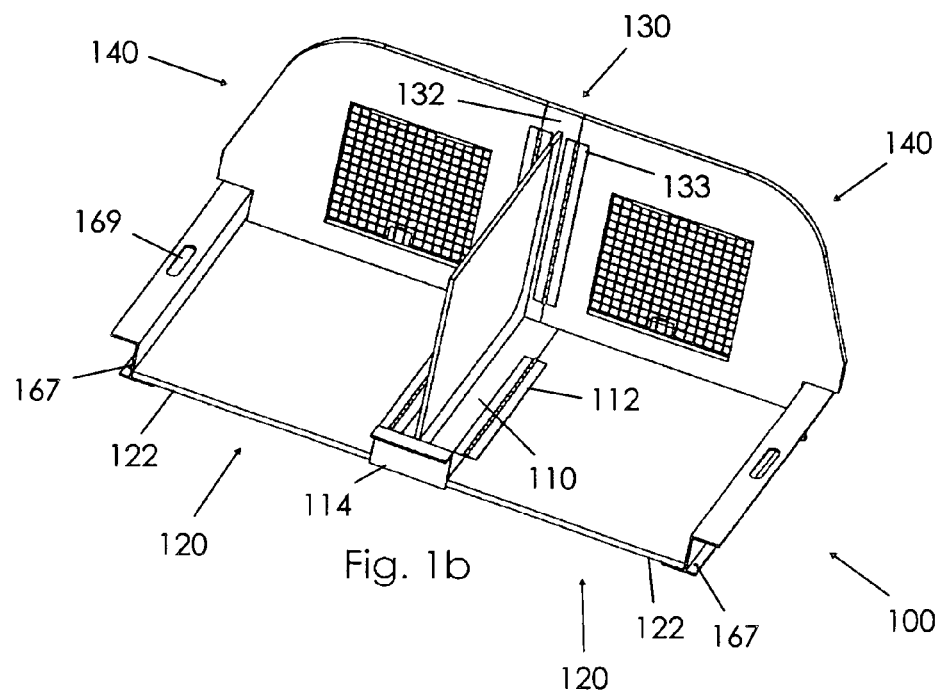
FIG. 1b is a rear perspective view of the collapsible kennel as in FIG. 1.

100 collapsible kennel
110 center floor panel
112 panel hinge
114 back support bracket
116 cavities in center floor panel
120 side floor panel 122 bottom face of side floor panel
123 outer edge of side floor panel
126 interlocking support mechanism
127 handle
130 center front panel
132 rear face of center front panel
133 panel hinge
140 side front panel
144 bottom surface of side front panel
145 inner surface of side front panel
146 top surface of side front panel
147 outer surface of side front panel
148 panel bolt
149 door opening
150 divider base
152 divider insert
160 side support bracket
161 upper lip of side support bracket
162 bottom lip of side support bracket
163 vertical wall of side support bracket
167 side support bracket hole
168 clamp bolt
169 opening in upper lip of side support bracket
170a folding-gate
170b wire grate door
171a slider
172a folding-gate track
172b spring-loaded hinge
173a spring
174a folding-gate eyelet
174b sliding bolt assembly
175a side front panel eyelet
175b bolt catch
177b truck cap eyelet
178 cord
200 collapsible kennel embodiment
220 floor panel
221 top face of floor panel
222 bottom face of floor panel
224 front lip of floor panel
229 holes in front lip of floor panel
233 panel hinge
240 front panel
241 front face of front panel
242 rear face of front panel
244 bottom surface of front panel
245 inner surface of front panel
246 top surface of front panel
247 outer surface of front panel
248 front panel hole
249 panel bolt
250 divider
251 divider hinge
254 bracket
255 divider hole
256 bracket hole
258 divider bolt
300 collapsible kennel embodiment
301 rear enclosure
380 center rear panel
387 outer surface of center rear panel
390 side rear panel
394 bracket
398 bolts
399 window

DESCRIPTION OF THE PREFERRED EMBODIMENT

A collapsible kennel for use with capped truck beds according to the present invention will now be described in detail with reference to FIGS. 1 through 11c of the accompanying drawings. A collapsible kennel 100 according to a now preferred embodiment includes a center floor panel 110 having a generally rectangular configuration fixedly attached to a center front panel 130 and pivotally coupled to a pair of side floor panels 120 by a set of panel hinges 112, each floor panel having generally rectangular configurations. A back support bracket 114 is fixedly attached to the center floor panel 110 opposite the center front panel 130 and rests on a back rail of a truck bed to help support the weight of the collapsible kennel 100 and its contents.

The center floor panel 130 defines a horizontal axis relative to the floor panels 110 that are hingedly coupled thereto. More particularly, each floor panel 110 is separately movable between an extended use configuration planar with the center floor panel 130 and a folded storage configuration generally perpendicular relative to the center floor panel 130 (FIGS. 4b to 5b).

Figure 4A:
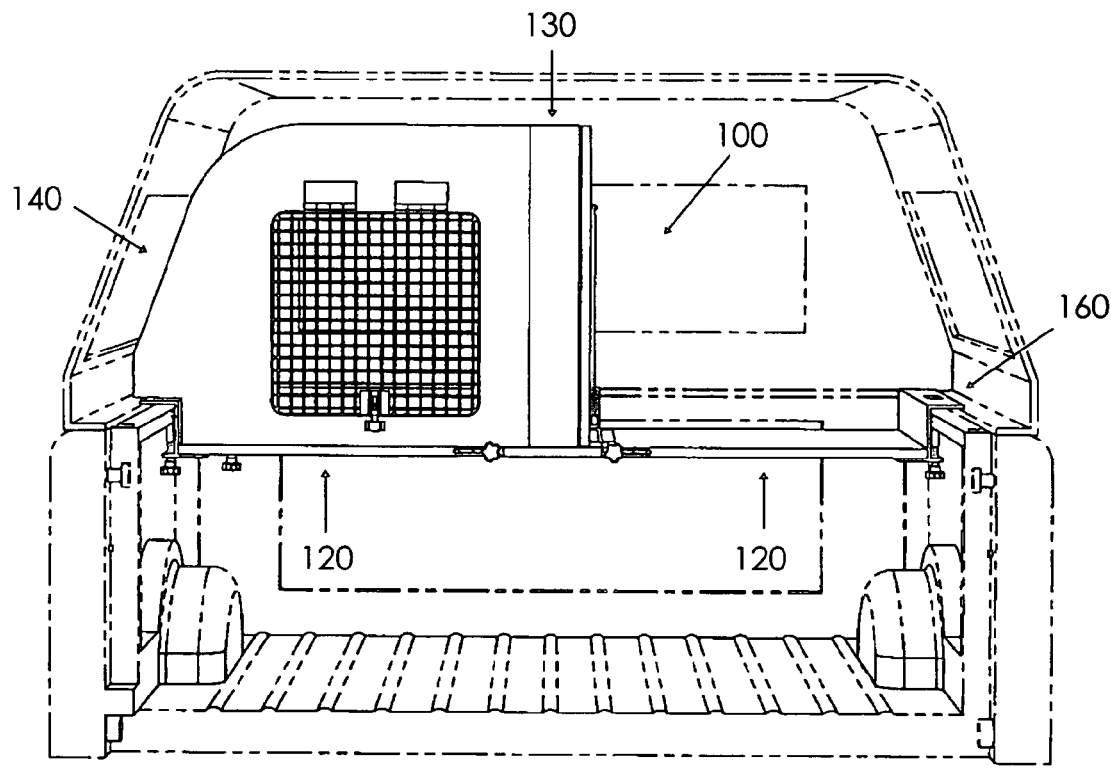
FIG. 4a is a front view of the collapsible kennel as in FIG. 2 being collapsed.
Figure 4B:
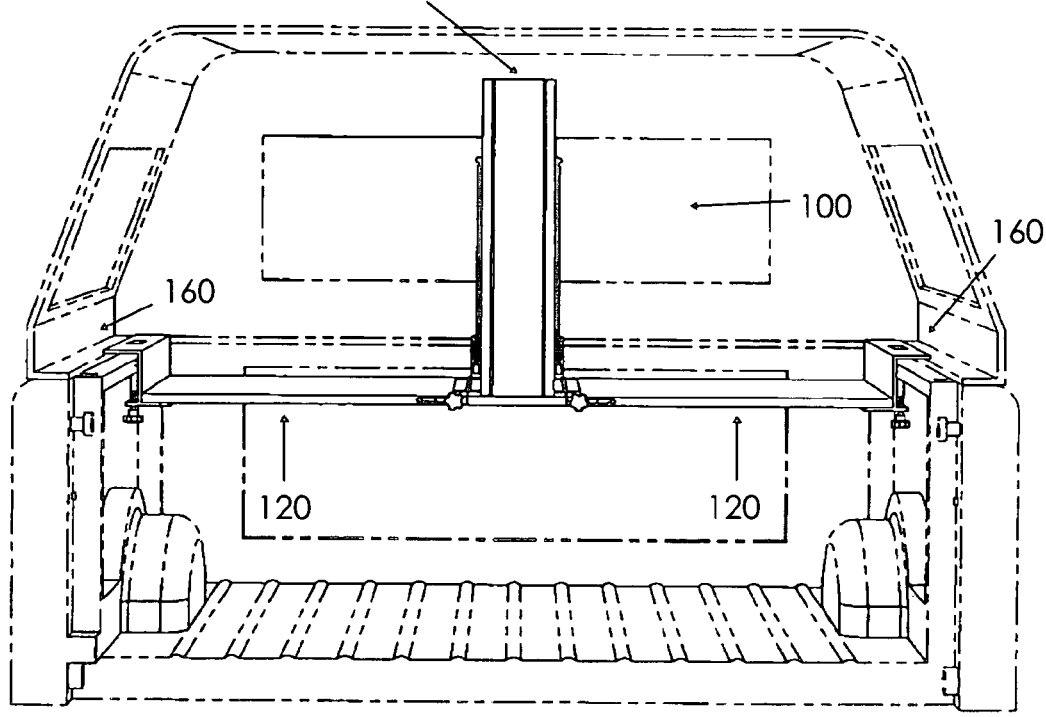
FIG. 4b is a front view of the collapsible kennel as in FIG. 4a being further collapsed.
Figure 5A:
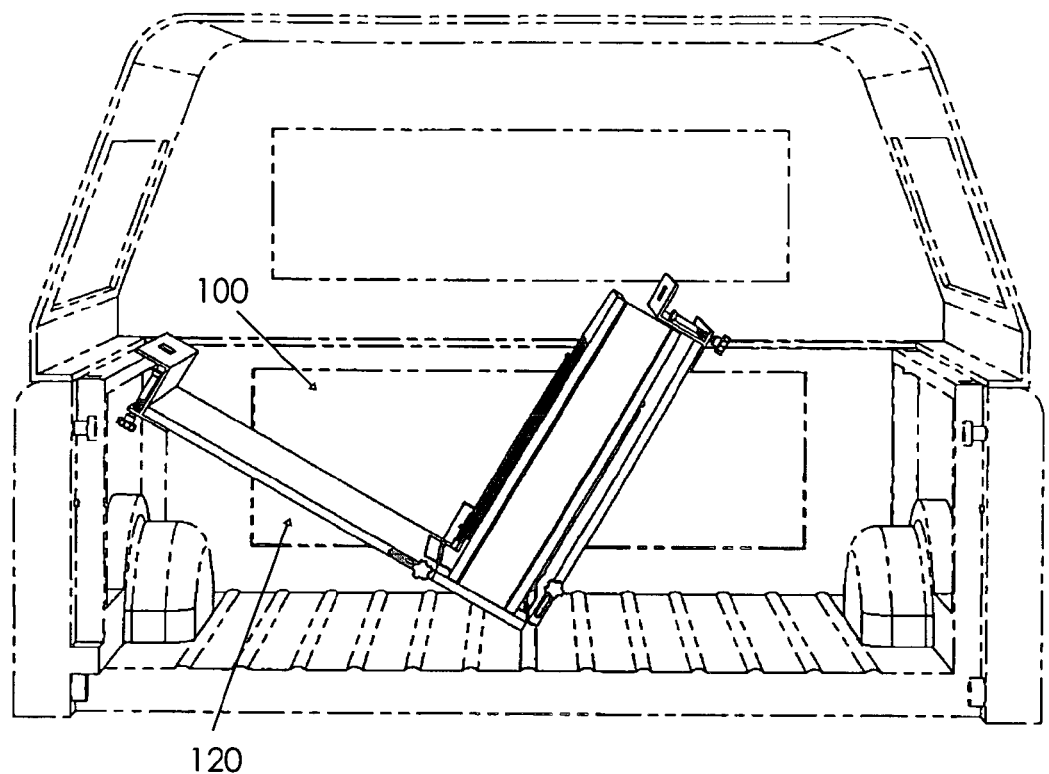
FIG. 5a is a front view of the collapsible kennel as in FIG. 4b being further collapsed.
Figure 5B:
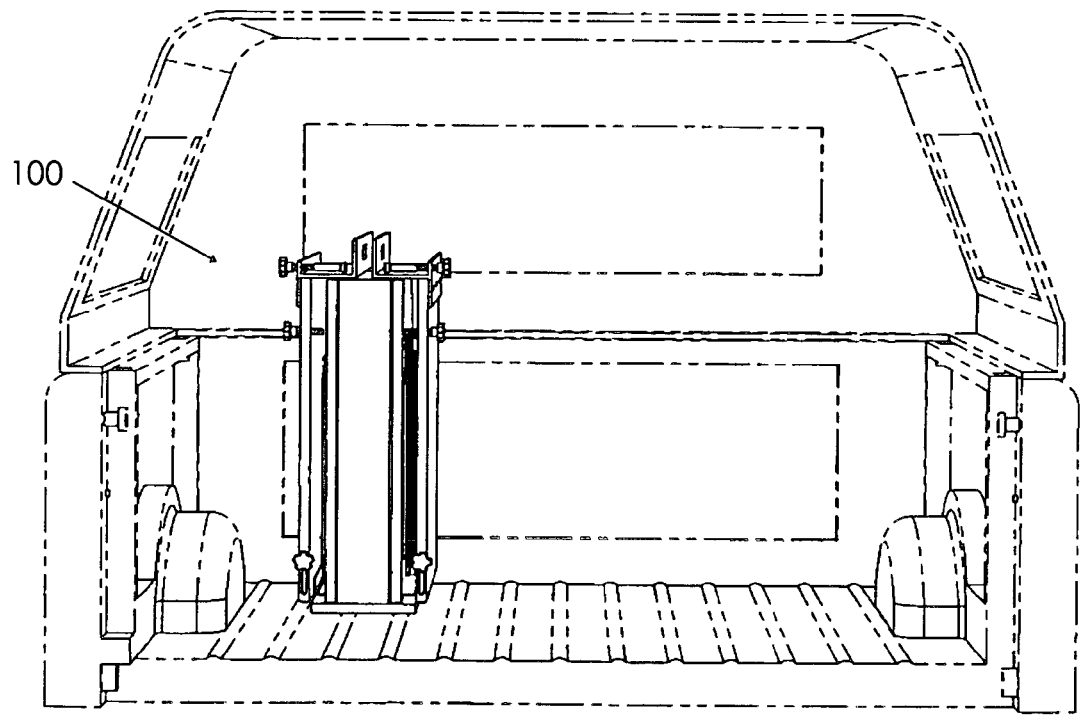
FIG. 5b is a front view of the collapsible kennel as in FIG. 2 in a fully collapsed configuration.
Figure 8A:
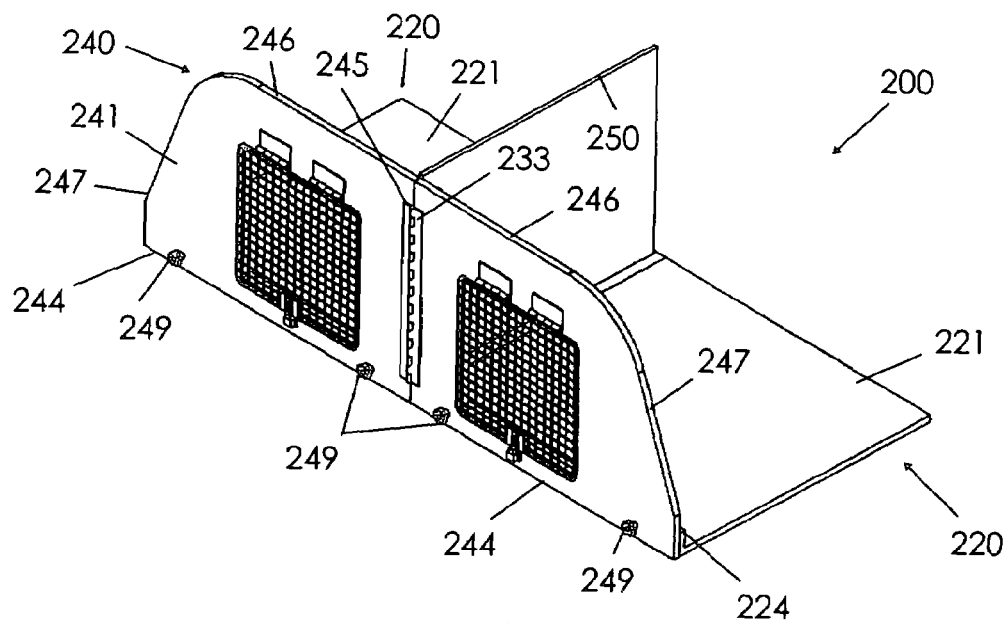
FIG. 8a is a front perspective view of a collapsible kennel according to another embodiment of the present invention.
Figure 8B:
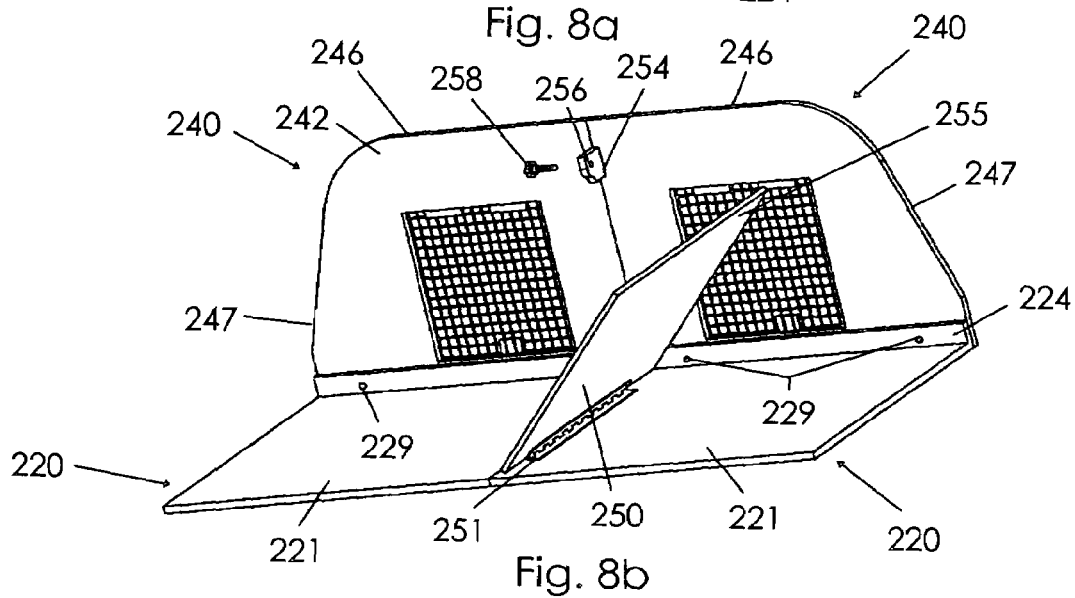
FIG. 8b is a rear perspective view of the collapsible kennel as in FIG. 8a being collapsed.
Figure 9A:
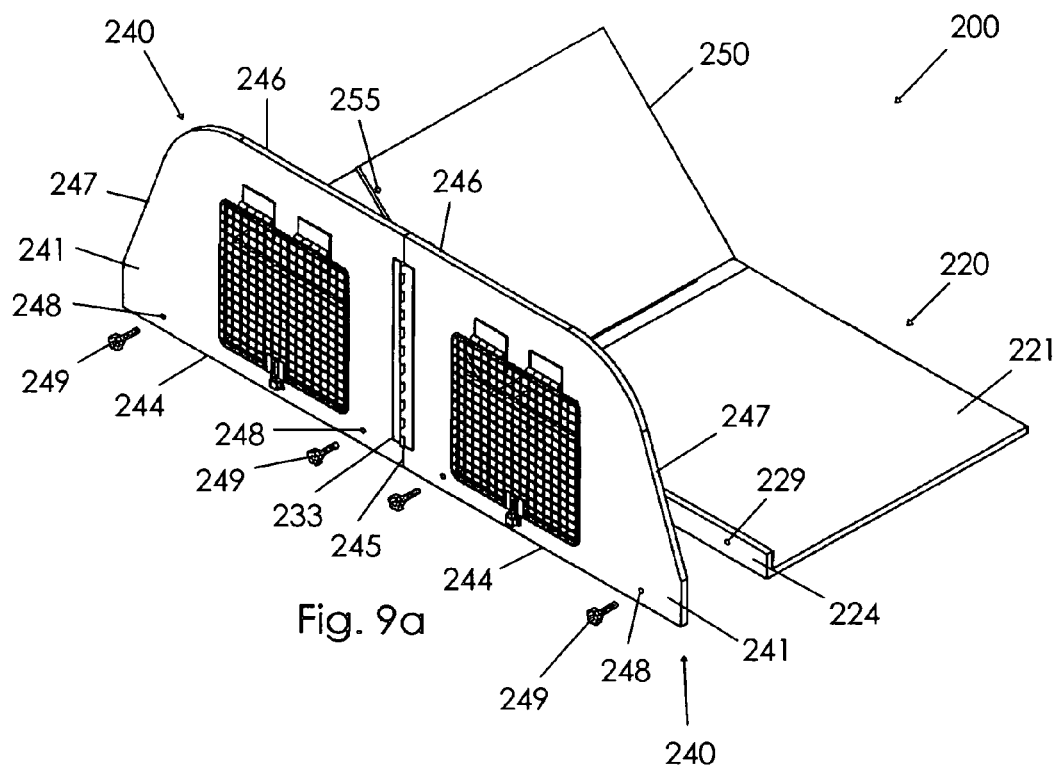
FIG. 9a is a perspective view of the collapsible kennel as in FIG. 8b being further collapsed.
Figure 9B:
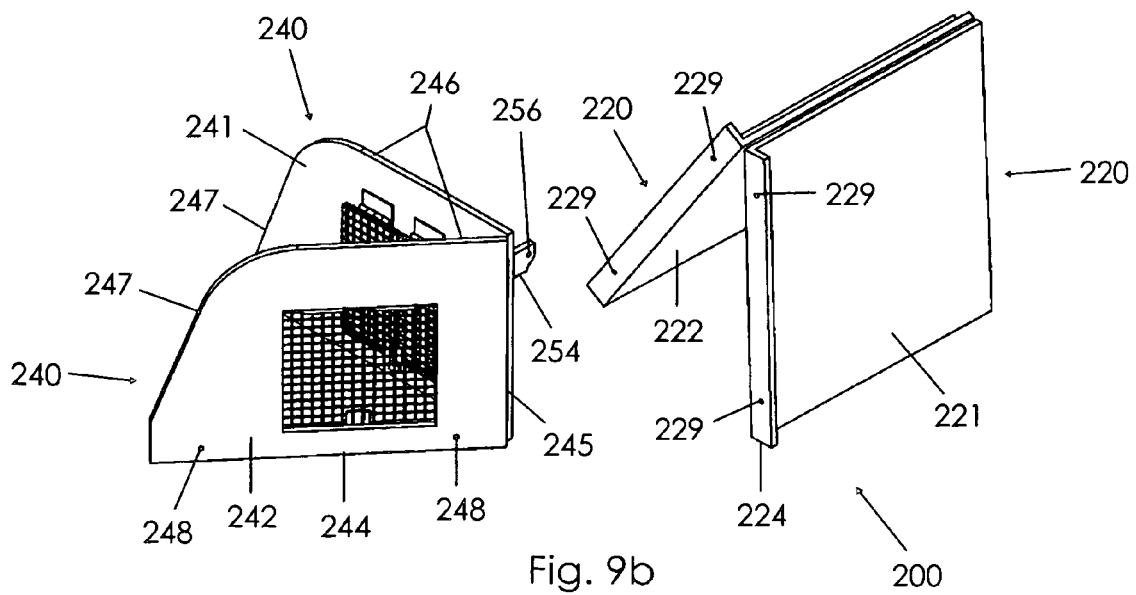
FIG. 9b is a perspective view of the collapsible kennel as in FIG. 9a being further collapsed.

A side support bracket 160 is positioned along an outer edge 123 of each side floor panel 120 and fixedly attached to each side floor panel 120 at a bottom face 122 thereof. An upper lip 161 of each side support bracket 160 can rest on a respective side rail of the truck bed to support the weight of the collapsible kennel 100 and its contents. A bottom lip 162 of each side support bracket 160 defines holes 167. A clamp bolt 168 passes through each hole 167, creating a C-clamp, and can secure the collapsible kennel 100 to a respective side rail of the truck bed. This is best seen in FIGS. 4a, 4b, and 6c. Each upper lip 161 has an opening 169 which acts as a convenient carrying handle when the collapsible kennel 100 is in a fully collapsed configuration, as shown in FIG. 5b.

Inside each side floor panel 120 is an interlocking support mechanism 126 that slides into cavities 116 in the center floor panel 110 by sliding a handle fastener 127 toward the center floor panel 110. This is best shown in FIGS. 7a and 7b and, in effect, produces a single rigid floor panel for supporting the weight of the collapsible kennel 100 and its contents. The interlocking support mechanism 126 is preferably made of metal. The interlocking mechanism 126 and handle 127 is the preferred fastener although other slidable fasteners would work. The slidable handles 127 may also be referred to as first and second floor panel fasteners. The slidable fastener arrangement is useful for holding and releasing the floor panels 120 between the extended and storage configurations described above. For example, the slidable handles 127 may be slidably moved such that the prongs of the interlocking support mechanism 126 cooperatively engage the cavities 116 of the center floor panel 130 It is understood, of course, that the locking action of the floor fasteners described herein are only effective when the floor panels 120 are in the extended configurations, i.e. such that the cavities 116 are situated to receive the prongs.

A divider base 150 is fixedly attached atop the center floor panel 110 and fixedly attached to a rear face 132 of the center front panel 130, adding structural support to the collapsible kennel 100. A divider insert 152 is removably attached to the divider base 150 The divider base 150 and insert 152 may be collectively referred to as a partition as they effectively divide the interior space of the kennel 100 into separate kennel spaces.

A pair of side front panels 140 are pivotally coupled to the rear face 132 of the center front panel 130 by a set of panel hinges 133. Each side front panel 140 includes a generally rectangular configuration having a linear bottom surface 144, a linear inner surface 145, and linear top surface 146, but with an outer top surface 147 being complementary to the shape of a truck cap and a truck bed's side rail. The front panels 130 are pivotally movable on respective hinges 133 between open and closed configurations (FIGS. 4a and 4b). It is understood that the center front panel 130 defines a vertical axis about which the front panels 130 are designed to pivot. It should be appreciated that front and rear walls of the truck cap itself may provide the equivalent of the front panels 140 if the floor panels 120 are appropriately dimensioned and positioned in a truck bed.

The side front panels 140 may be secured to the side floor panels 120 by two removable panel bolts 148, as best seen in FIG. 6c. The panel bolts 148 may be referenced as first and second front panel fasteners that may be selectively extended through respective floor panels 120 into cooperative engagement with respective front panels 130, whereby to releasably hold the front panels at closed configurations or to release them to open configurations. It is understood that the front panels and front panel fasteners are separately operable.

Figure 10A:
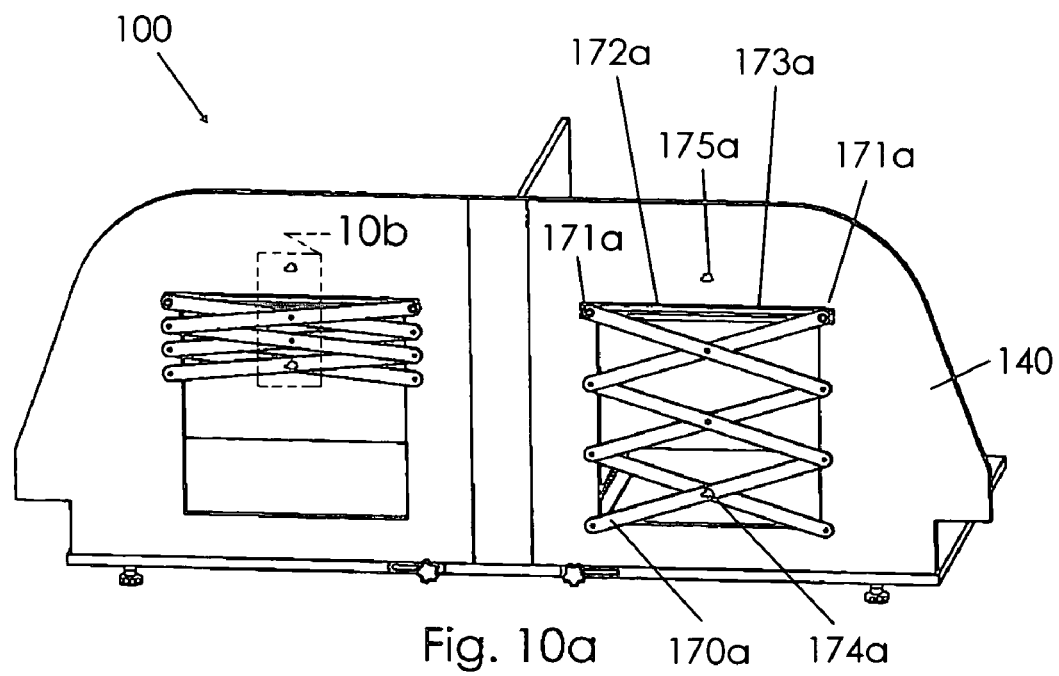
FIG. 10a is a perspective view of the collapsible kennel as in FIG. 1 with an alternate door.
Figure 10B:
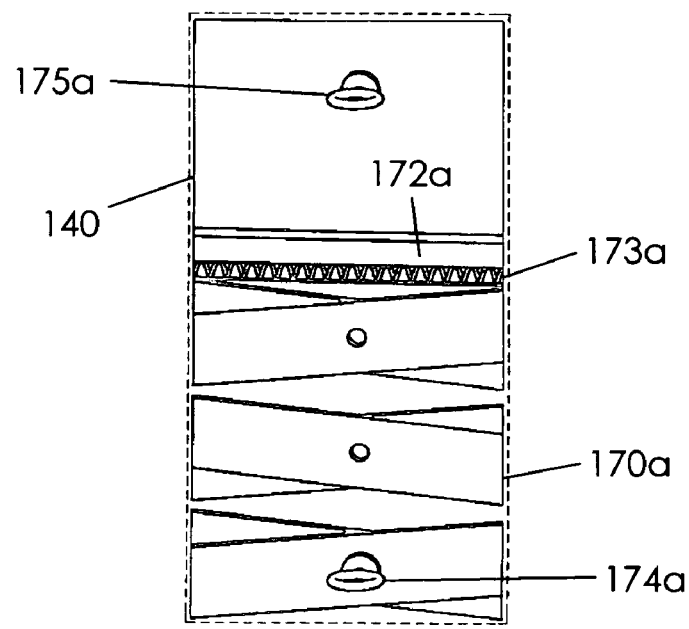

Each side front panel 140 defines a door opening 149 for animal ingress and egress. The preferred door to cover door opening 149 is a folding-gate 170a, shown in FIGS. 10a and 10b. A pair of sliders 171a on the folding-gate 170a move along a track 172a that is fixedly secured to the side front panel 140. A spring 173a attaches the sliders 171a to make the folding-gate 170a self-closing. The spring 173a should be stiff enough to prevent a dog from opening the folding-gate 170a with his paw or snout. An eyelet 174a is fixedly attached to each folding-gate 170a, and an eyelet 175a is fixedly attached to each side front panel 140 directly above each eyelet 174a. This is best seen in FIG. 10b. A cord or cable can then be secured to each eyelet 174a, pass through each eyelet 175a, and be pulled horizontally by a user to exert a vertical force and open each folding-gate 170a.

Figure 2:
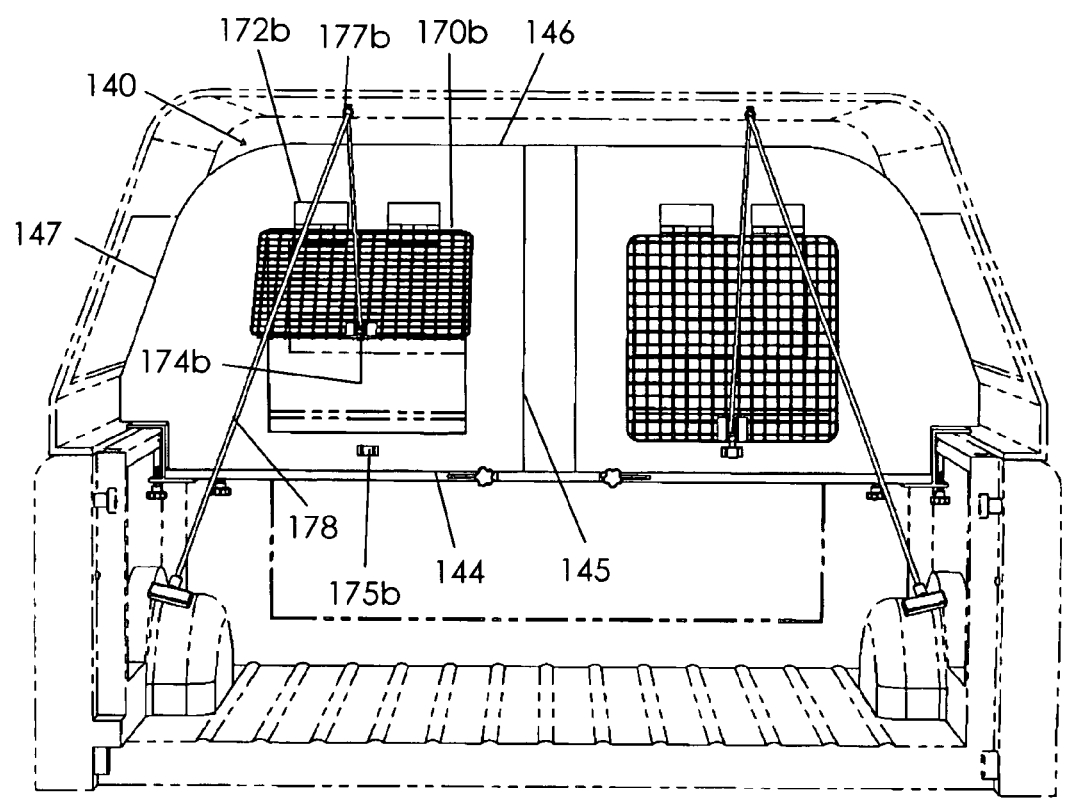
FIG. 2 is a front view of the collapsible kennel as in FIG. 1 in use on a capped pickup truck.
Figure 3:
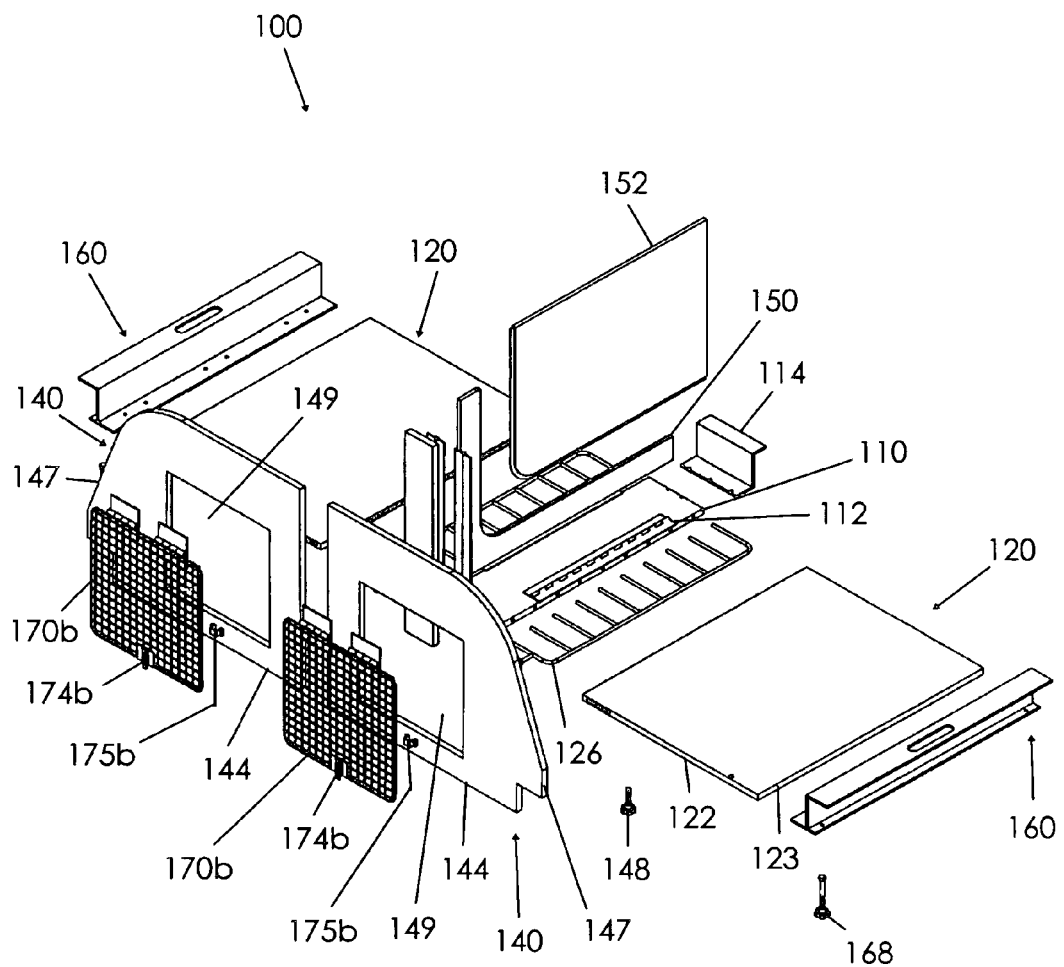
FIG. 3 is an exploded view of the collapsible kennel as in FIG. 1.

The door opening 149 may alternatively be covered by a wire grate door 170b. The wire grate door 170b is pivotally coupled to the side front panel 140 by a set of spring-loaded hinges 172b. A conventional sliding bolt assembly 174b is fixedly attached to the wire grate door 170b, and a compatible bolt catch 175b is fixedly attached to the side front panel 140 where the sliding bolt assembly 174b and the bolt catch 175b can connect. A cord or cable 178 can then be secured to the sliding bolt assembly 174b and pass through an eyelet 177b that is permanently mounted to the truck cap. Eyelet 177b provides the angle needed for the cord 178 to release the bolt in the sliding bolt assembly 174b and pull the wire grate door 170b open (FIG. 2).

The combined widths of the center floor panel 110, the two side floor panels 120, and the two vertical walls 163 of side support brackets 160 are preferably slightly less than the distance between the truck bed's side rails. When unfolded and assembled, the collapsible kennel 100 may be placed with the upper lips 161 of side support brackets 160 atop the truck bed's side rails, leaving cargo space available in the truck bed. When positioned against the truck cab and secured by clamp bolts 168, the collapsible kennel 100 would provide a floor and one wall of a kennel, the truck cab would provide a second wall, and the truck cap would provide the final two walls and ceiling. Since truck beds come in various widths, various combinations may be needed to ensure a good fit with different trucks. Multiple center floor panels 110 and center front panels 130 may be provided to allow the user to assemble the collapsible kennel 100 with the components that match the width of his truck bed. Truck caps also come in different sizes, and while this will not be significant in most cases, some caps may leave enough of a gap for an animal to climb out of the kennel. In such cases, the side front panels 140 can be custom made or extra material can be added to cover the gap. A flexible frame may also be added that could slide up to meet the contours of the cap.

In use, the collapsible kennel 100 may be collapsed as shown in FIGS. 4a through 5b. First, panel bolts 148 may be removed and side front panels 140 are folded in toward the divider base 150 (FIGS. 4a and 4b). Next, clamp bolts 168 are loosened, and handles 127 are slid away from the center floor panel 110 to disengage the interlocking support mechanism 126. The side floor panels 120 are then folded upwards toward the divider base 150 as shown in FIGS. 5a and 5b. FIG. 5b shows the collapsible kennel 100 fully collapsed into a one-piece package.

A collapsible kennel 200 according to another embodiment of the present invention is shown in FIGS. 8a through 9b and includes a construction substantially similar to the construction previously described except as specifically noted below. More particularly, the collapsible kennel 200 according to this embodiment includes two floor panels 220 having generally rectangular configurations pivotally coupled along a bottom face 222 by a set of panel hinges (not shown). Each floor panel 220 has a front lip 224 defining holes 229. A divider 250 is pivotally coupled to one of the floor panels 220 by a divider hinge 251 at a top face 221.

A pair of front panels 240 are pivotally coupled together by a panel hinge 233 situated on a front face 241 of each of respective front panels 240. The front panels 240 have a linear bottom surface 244 perpendicular to a linear inner surface 245 perpendicular to a linear top surface 246. In the same manner described previously, the linear top surface 246 transitions into an outer surface 247 designed to approximate the shape of a truck cap. The front panels 240 have holes 248 that correspond to holes 229 when the front panels 240 are lined up with the floor panels 220. Panel bolts 249 selectively couple the front panels 240 with the floor panels 220. A bracket 254 having a hole 256 is fixedly attached to a rear face 242 of one front panel 240.

The divider 250 has a hole 255 that corresponds to hole 256 of bracket 254 when the front panels 240 are combined with the floor panels 220 and the divider 250 is in a vertical position. Divider bolt 258 fastens the divider 250 with the bracket 254, maintaining the divider 250 in a vertical position.

Preferably, the combined widths of the two floor panels 220 are slightly more than the distance between the truck bed's side rails. When unfolded and assembled, the collapsible kennel 200 may be placed atop the truck bed's side rails, leaving cargo space available in the truck bed. When positioned against the truck cab, the collapsible kennel 200 would provide a floor and one wall of a kennel, the truck cab would provide a second wall, and the truck cap would provide the final two walls and ceiling.

FIGS. 8a through 9b show the collapsible kennel 200 being collapsed. First, divider bolt 258 is removed and the divider 250 is folded to the connected floor panel 220. Next, panel bolts 249 are removed and the front panels 240 are separated from the floor panels 220. The floor panels 220 are then folded, causing the bottom faces 222 to abut, and the front panels 240 are folded, causing the front faces 241 to abut.

A collapsible kennel 300 according to another embodiment of the present invention is shown in FIGS. 11a through 11c and includes a construction substantially similar to the construction first described above except as specifically noted below. More particularly, the collapsible kennel 300 according to this embodiment includes a center rear panel 380 pivotally coupled to a pair of side rear panels 390 by a set of panel hinges (not shown). The side rear panels 390 can include windows 399.

A bracket 394 with holes (not shown) fixedly attached to the bottom of outer surface 387 of the center rear panel 380. Bolts 398 pass through the bracket holes to create a C-clamp for attaching the rear enclosure 301 to the center floor panel 110 of the collapsible kennel 100. The back support bracket 114 must be removed from the collapsible kennel 100.

When unfolded and assembled, the collapsible kennel 300 may be placed with the upper lips 161 of side support brackets 160 atop the truck bed's side rails, leaving cargo space available in the truck bed. The collapsible kennel 300 may be positioned anywhere along the truck bed's side rails and secured by clamp bolts 168. The collapsible kennel 300 would provide a floor and two opposing walls of a kennel, and the truck cap would provide the final two walls and ceiling.

The center rear panel 380 is preferably more narrow and shorter than center front panel 130, and the side rear panels 390 is preferably more narrow and shorter than the side front panels 140. This allows rear enclosure 301 to fold into the one-piece package of the collapsible kennel 100 when both the collapsible kennel 100 and the rear enclosure 301 are completely collapsed.

It is understood that while certain forms of this invention have been illustrated and described, it is not limited thereto except insofar as such limitations are included in the following claims and allowable functional equivalents thereof.

What is claimed is:

1. A dog kennel for use with a truck cap mounted atop a pickup truck bed having a pair of opposed side rails, said dog kennel comprising:
    a first floor panel connected to a second floor panel for pivotal movement relative thereto, said first and second floor panels being movable between a planar extended configuration and a folded storage configuration;
    a first side support bracket attached to a free end of said first floor panel and a second side support bracket attached to a free end of said second floor panel for supporting said first and second floor panels, respectively, atop the side rails of the truck when said first and second floor panels are at said extended configuration;
    a center floor panel situated intermediate said first and second floor panels for displacing said first and second floor panels from one another and defining a horizontal axis, said first and second floor panels being pivotally coupled to said center floor panel and movable about said horizontal axis;
    a center front panel connected to said center floor panel and extending upwardly therefrom so as to define a vertical axis; and
    first and second front panels pivotally coupled to said center front panel for separately operable movement about said vertical axis between front panel extended and storage configurations.

2. The dog kennel as in claim 1 further comprising:
    a first floor panel fastener slidably mounted to said first floor panel for releasably engaging said center floor panel when said first floor panel is at said extended configuration; and
    a second floor panel fastener slidably mounted to said second floor panel for releasably engaging said center floor panel when said second floor panel is at said extended configuration, whereby said first and second floor panel fasteners selectively hold said first and second floor panels at said extended configuration.

3. The dog kennel as in claim 1 further comprising first and second front panel fasteners coupled to respective floor panels and separately movable between extended configurations engaging respective front panels and retracted configurations displaced from said respective front panels.

4. The dog kennel as in claim 1 wherein said first and second front panels each define a door opening; and
    said dog kennel further comprising a pair of door coverings mounted to respective first and second front panels for covering said door openings.

5. The dog kennel as in claim 4 wherein each respective door covering is a folding-gate door movable between open and closed configurations.

6. The dog kennel as in claim 4 wherein each respective door covering is a wire grate door that is pivotally movable between open and closed configurations.

7. The dog kennel as in claim 1 further comprising a partition coupled to said center floor panel, whereby to define separate interior kennel spaces.

8. The dog kennel as in claim 1 further comprising a partition pivotally coupled to a respective floor panel and selectively movable between vertical and horizontal configurations.

9. The dog kennel as in claim 1 further comprising:
    a center back panel connected to said center floor panel opposite said center front panel and extending upwardly therefrom; and
    first and second back panels coupled to said center back panel, said first and second back panels having configurations substantially similar to configurations of said first and second front panels, respectively.

10. A dog kennel for use with a truck cap mounted atop a pickup truck bed having a pair of opposed side rails, said dog kennel comprising:
    a frame structure having a center floor panel defining a horizontal axis and a center front panel extending upwardly from said center floor panel defining a vertical axis;
    a first floor panel and a second floor panel pivotally coupled to opposed edges of said center floor panel for movement about said horizontal axis between a planar extended configuration and a folded storage configuration;
    a first side support bracket connected to said first floor panel and a second side support bracket connected to said second floor panel for supporting said first and second floor panels, respectively, atop the side rails of the truck when said first and second floor panels are at said extended configuration;
    a first front panel and a second front panel pivotally coupled to opposed edges of said center front panel for separately operable movement about said vertical axis between front panel planar extended and folded storage configurations.

11. The dog kennel as in claim 10 further comprising first and second floor panel fasteners mounted to first and second floor panels, respectively, said first and second floor panel fasteners being separately movable between locked configurations extending from said respective floor panels and released configurations retracted within said respective floor panels, said first and second floor panel fasteners being separately movable to said locked configurations for receipt into complementary receptacles defined by said center floor panel, whereby to releasably hold said first and second floor panels at said extended configuration.

12. The dog kennel as in claim 10 further comprising first and second front panel fasteners coupled to respective floor panels and separately movable between extended configurations engaging respective front panels and retracted configurations displaced from said respective front panels.

13. The dog kennel as in claim 10 wherein said first and second front panels each define a door opening; and said dog kennel further comprising a pair of door coverings mounted to respective first and second front panels for covering said door openings.

14. The dog kennel as in claim 13 wherein each door covering is a folding-gate door movable between open and closed configurations.

15. The dog kennel as in claim 13 wherein said door covering is a wire grate door that is selectively movable between open and closed configurations.

16. The dog kennel as in claim 13 wherein each of said pair of door coverings is movable between open and closed configurations; and said dog kennel further comprising means connected to said pair of door coverings for selectively moving said each of said door coverings between said open and closed configurations from a position remote from said door coverings.

17. The dog kennel as in claim 10 further comprising a partition coupled to said center floor panel, whereby to define separate interior kennel spaces.

18. The dog kennel as in claim 10 further comprising:

a center back panel connected to said center floor panel opposite said center front panel and extending upwardly therefrom; and first and second back panels coupled to said center back panel, said first and second back panels having configurations substantially similar to configurations of said first and second front panels, respectively.

19. A dog kennel for use with a truck cap mounted atop a pickup truck bed having a pair of opposed side rails, said dog kennel comprising:

a first floor panel connected to a second floor panel for pivotal movement relative thereto, said first and second floor panels being movable between a planar extended configuration and a folded storage configuration;

a first side support bracket attached to a free end of said first floor panel and a second side support bracket attached to a free end of said second floor panel for supporting said first and second floor panels, respectively, atop the side rails of the truck when said first and second floor panels are at said extended configuration; and a partition pivotally coupled to a respective floor panel and selectively movable between vertical and horizontal configurations.

* * * * *